United States Patent
Katoh

(10) Patent No.: US 12,476,841 B2
(45) Date of Patent: Nov. 18, 2025

(54) CONTROL DEVICE, COMMUNICATION CONTROL METHOD, AND STORAGE MEDIUM

(71) Applicant: TOYOTA JIDOSHA KABUSHIKI KAISHA, Toyota (JP)

(72) Inventor: Teruyoshi Katoh, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 18/176,715

(22) Filed: Mar. 1, 2023

(65) Prior Publication Data

US 2023/0403178 A1  Dec. 14, 2023

(30) Foreign Application Priority Data

May 18, 2022  (JP) ................... 2022-081280

(51) Int. Cl.
*H04L 12/40* (2006.01)

(52) U.S. Cl.
CPC ............ *H04L 12/40006* (2013.01); *H04L 2012/40273* (2013.01)

(58) Field of Classification Search
CPC ..... H04L 12/40006; H04L 2012/40273; H04L 2012/40215; H04L 67/125
See application file for complete search history.

(56) References Cited

U.S. PATENT DOCUMENTS

| | | | |
|---|---|---|---|
| 7,184,484 B1* | 2/2007 | Kim | H04L 1/1692 375/321 |
| 11,539,714 B2* | 12/2022 | Ye | G06F 16/285 |
| 12,407,162 B2* | 9/2025 | Sakakibara | H02H 7/1213 |
| 2011/0128855 A1* | 6/2011 | Ando | H04L 12/4625 370/236 |
| 2018/0323999 A1* | 11/2018 | Stolpe | G05B 19/0426 |
| 2019/0095371 A1* | 3/2019 | Yoshino | B60R 16/0238 |
| 2021/0400056 A1* | 12/2021 | Klosters | H04L 63/123 |

FOREIGN PATENT DOCUMENTS

| | | |
|---|---|---|
| JP | 2008-278403 A | 11/2008 |
| JP | 2017-144861 A | 8/2017 |

* cited by examiner

*Primary Examiner* — Rasheed Gidado

(74) *Attorney, Agent, or Firm* — Oblon, McClelland, Maier & Neustadt, L.L.P.

(57) ABSTRACT

The control device is the first classification of control device in a communication control system including a first classification of control device and one or more second classifications of control devices connected to the same bus as the first classification of control device. The control device includes a transmission and reception unit that transmits or receives a signal via the bus by a half-duplex communication method, and a control unit that prohibits driving of the transmission and reception unit when the occurrence of an abnormality in the own device is detected.

11 Claims, 6 Drawing Sheets

FIG. 4

| DESCRIPTION OF THE ERROR | STATE OF THE COMMUNICATION LINES 31 AND 32 | RESPONSE | |
|---|---|---|---|
| | | ECU10 | ECU20 |
| ECU 10 ERROR (TERMINAL Tx ATTACHED TO Lo) | DOMINANT FIXATION | PROHIBITION OF DRIVING OF THE TRANSMISSION AND RECEPTION UNIT 102 | CONTROL SUCH THAT THE VEHICLE 2 RUNS NORMALLY OR FAIL-SAFE |

CONTROL DEVICE, COMMUNICATION CONTROL METHOD, AND STORAGE MEDIUM

CROSS-REFERENCE TO RELATED APPLICATION

This application claims priority to Japanese Patent Application No. 2022-081280 filed on May 18, 2022, incorporated herein by reference in its entirety.

BACKGROUND

1. Technical Field

The present disclosure relates to a control device, a communication control method, and a storage medium.

2. Description of Related Art

It has been known to control the travel of a vehicle by mounting on the vehicle a communication control system in which a plurality of control devices (e.g., an electronic control unit (ECU)) performs communication by a half-duplex communication method via a bus.

It is also known that the vehicle is caused to travel in a fail-safe manner when communication between the plurality of control devices cannot be normally performed due to occurrence of an abnormality in one of the plurality of control devices. For example, Japanese Unexamined Patent Application Publication No. 2017-144861 (JP 2017-144861 A) describes a technique of controlling an engine so that a vehicle travels in a fail-safe manner when communication between a plurality of control devices used for engine control cannot be normally performed.

SUMMARY

In a communication control system mounted on a vehicle, it is conceivable that a plurality of control devices of various uses is connected to the same bus. For example, is it conceivable that a communication network in which a control device of a first classification (for example, at least one of an ECU for solar charging, an ECU for car navigation, and an ECU for multimedia) in which fail-safe operation of the vehicle is not required when an abnormality occurs in the own device and a control device of a second classification (for example, at least one of an ECU for engine control, an ECU for brake control, and an ECU for steering control) in which fail-safe operation of the vehicle is required when an abnormality occurs in the own device are connected on the same bus is mounted on the vehicle.

However, in JP 2017-144861 A, since it is not assumed that the plurality of control devices of various uses as described above is connected to the same bus, there is an issue that the vehicle is uniformly caused to travel in a fail-safe manner when an abnormality occurs in one of the plurality of control devices. Such an issue is not limited to a communication control system mounted on a vehicle, and may also occur in a communication control system mounted on other devices.

The present disclosure provides a control device, a communication control method, and a storage medium capable of appropriately operating other control devices when an abnormality occurs in one control device in a communication control system in which a plurality of control devices connected to the same bus performs communication by a half-duplex communication method.

A control device according to a first aspect of the present disclosure is a control device of a first classification in a communication control system including the control device of the first classification and one or more control devices of a second classification connected to the same bus as the control device of the first classification. The control device includes: a transmission and reception unit that transmits or receives a signal via the bus by a half-duplex communication method; and a control unit that prohibits driving of the transmission and reception unit when an occurrence of an abnormality in an own device is detected.

A communication control method according to a second aspect of the present disclosure is a communication control method for a communication control system including a control device of a first classification and one or more control devices of a second classification connected to the same bus as the control device of the first classification. The communication control method includes: transmitting or receiving a signal via the bus by a half-duplex communication method by the control device of the first classification; and prohibiting driving of a transmission and reception unit by the control device of the first classification when an occurrence of an abnormality in an own device is detected.

In a storage medium according to a third aspect of the present disclosure, a communication control program causes a processor provided in a control device of a first classification in a communication control system including the control device of the first classification and one or more control devices of a second classification connected to the same bus as the control device of the first classification to function as: a transmission and reception unit that transmits or receives a signal via the bus by a half-duplex communication method; and a control unit that prohibits driving of the transmission and reception unit when an occurrence of an abnormality in an own device is detected.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram illustrating an example of an operation when an abnormality occurs in the communication control system 1 according to the present embodiment;

DETAILED DESCRIPTION OF EMBODIMENTS

Figure 1:
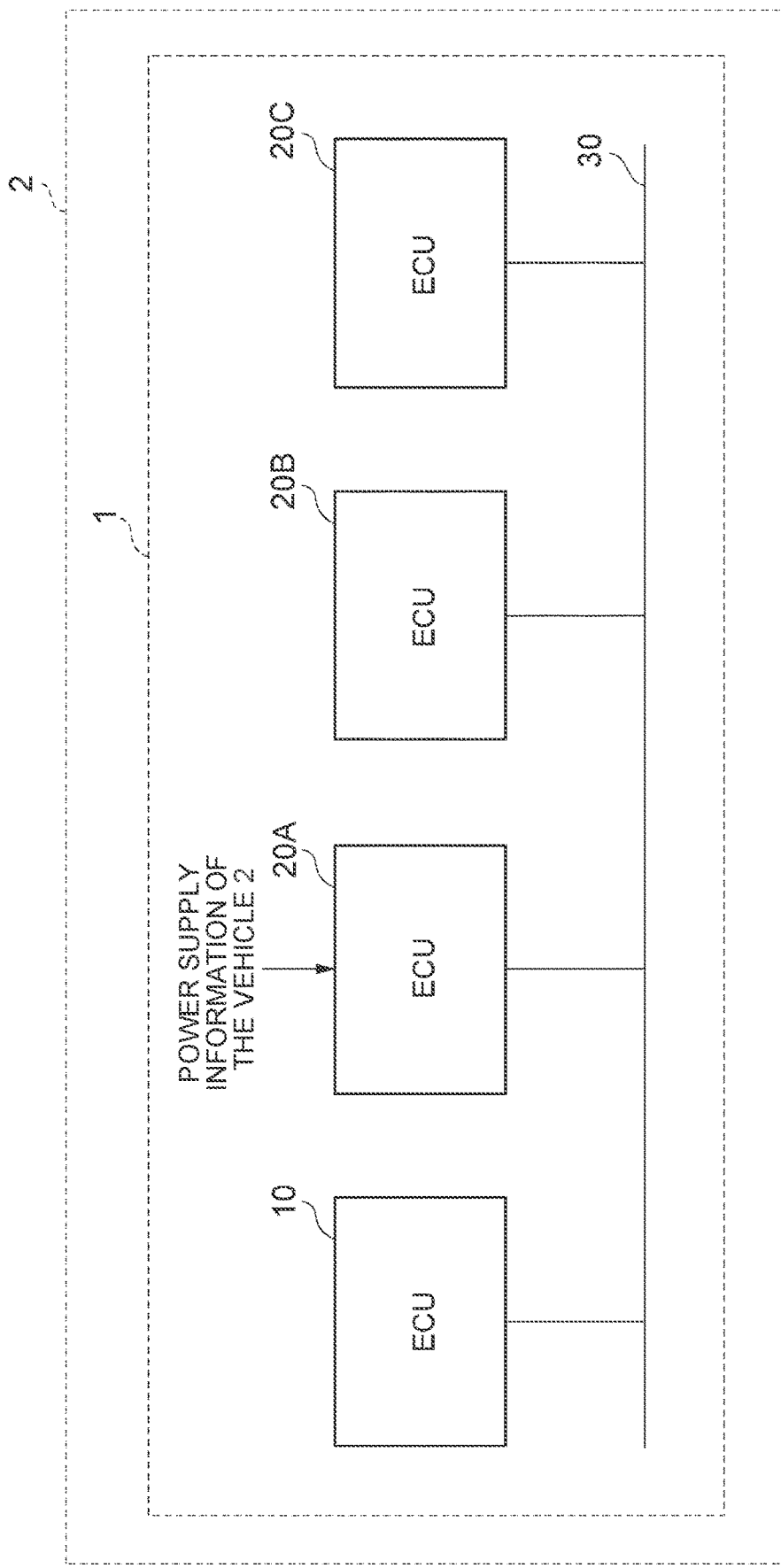
FIG. 1 is a diagram illustrating an example of an outline of a communication control system 1 according to the present embodiment.

Embodiments of the present disclosure will be described with reference to the accompanying drawings. In the drawings, components having the same reference numerals have the same or similar configurations.

Overview

FIG. 1 is a diagram illustrating an example of an outline of a communication control system according to the present embodiment. For example, in FIG. 1, the specific device on which the communication control system 1 is mounted is the vehicle 2, but the present disclosure is not limited thereto.

The communication control system 1 includes an ECU 10 as a control device of a first classification and one or more ECU 20 (for example, three ECU 20A, 20B and 20C) as a control device of a second classification. ECU 10 and the one or more ECU are connected to the same buses 30. Note that FIG. 1 is merely an example, and the number of ECU 10 and the number of ECU 20 are not limited to those illustrated.

ECU 10 is a control device in which fail-safe operation of the vehicle 2 is not required when an error occurs in the own device. ECU 10 may be, for example, at least one of an ECU for solar charging, an ECU for car navigation, and an ECU for multimedia. Since ECU 10 is not directly related to the traveling of the vehicle 2, the vehicle 2 can be caused to travel normally even when an error occurs in the own device. As described above, even when an abnormal ECU 10 occurs, the normal operation of the vehicles 2 is permitted based on the predetermined condition.

ECU 20 is a control device that requires fail-safe operation of the vehicle 2 when an error occurs in the own device. ECU 20 may be, for example, at least one of an ECU for engine-control, an ECU for brake-control, and an ECU for steering control. Since ECU 20 is directly related to the traveling of the vehicle 2, the vehicle 2 needs to be stopped safely when an error occurs in the own device.

Here, the fail-safe operation is to operate a specific device on which the communication control system 1 is mounted on the safety side when an abnormality occurs in the communication control system 1. For example, as illustrated in FIG. 1, in a case where the communication control system 1 is mounted on the vehicle 2, the fail-safe operation may be running in order to safely stop the vehicle 2 when an abnormality occurs in the communication control system 1 (hereinafter, referred to as "fail-safe running").

On the other hand, the normal operation is to cause a specific apparatus on which the communication control system 1 is mounted to operate normally. For example, as shown in FIG. 1, when the communication control system 1 is mounted on the vehicle 2, the normal operation may be to cause the vehicle 2 to travel normally (hereinafter, referred to as "normal travel").

The fail-safe operation and the normal operation are realized by controlling the operation of ECU 20. For example, the fail-safe running and the normal running of the vehicle 2 are realized by ECU 20 switching the control operations of the components of the vehicle 2 (for example, the engine, the brake, the steering, and the like).

ECU 10 and one or more ECU 20 on the bus 30 transmit or receive signaling over the bus 30 in a half-duplex communication manner. For example, in FIG. 1, if one ECU (e.g., an ECU 10) on the bus 30 transmits a signal, the remaining ECU (e.g., either ECU 20A, or 20C) may not transmit a signal from the device. As described above, in the half-duplex communication scheme, ECU on the buses 30 cannot transmit and receive simultaneously. In the half-duplex communication system, a plurality of ECU cannot transmit signals simultaneously.

ECU 10 may control the operation of the own device based on information on the power supply of the vehicles 2 supplied from ECU 20 via the bus 30 (hereinafter, referred to as "power supply information"). The power supply information may indicate, for example, whether the power supply of the vehicle 2 is on or off. The power supply data is supplied to one of ECU 20A, 20B and 20C via a monitor line (not shown).

For example, when power supply information is supplied to ECU 20A via a monitor line (not shown), ECU 10, ECU 20B and ECU 20C may acquire the power supply information from ECU 20A via the bus 30. As described above, by connecting ECU 20A with ECU 10 to the same bus 30 to which the power supply information is supplied from the monitor line (not shown), ECU 10 can acquire the power supply information from ECU 20A via the bus 30. Therefore, ECU 10 requiring the power supply information does not need to newly provide the monitor line for the power supply information, and thus the cost can be reduced.

In the communication control system 1, ECU 10 separates ECU 10 from the bus 30 as will be described in detail later. When ECU 20 detects an anomaly in ECU 10, it may control the operation of the own device such that the vehicle 2 normally travels on the basis of a predetermined condition described later.

In the communication control system 1, ECU 20 may control the operation of the own device so that the vehicle 2 travels in a fail-safe manner when an anomaly of another ECU 20 is detected. In addition, ECU 20 may separate ECU 20 from the bus 30 when detecting an anomaly in its own device.

As described above, in the communication control system 1, the normal operation or the fail-safe operation of a particular device (for example, the vehicle 2) on which the communication control system 1 is mounted is switched according to the type of ECU (hereinafter, referred to as "failure ECU") in which the occurrence of the abnormality is detected. More specifically, ECU other than the failure ECU controls the operation of the own device such that the particular device performs normal operation or fail-safe operation based on whether the failure ECU is a type of ECU for which fail-safe operation is required. Therefore, ECU other than the failure ECU can be appropriately operated.

Hereinafter, a specific apparatus on which the communication control system 1 is mounted is the vehicle 2. Normal operation of the specific device is normal running of the vehicle 2. The fail-safe driving of the specific apparatus is the fail-safe driving of the vehicle 2. However, it is of course not limited to these.

Configuration of Communication Control System

Figure 2:
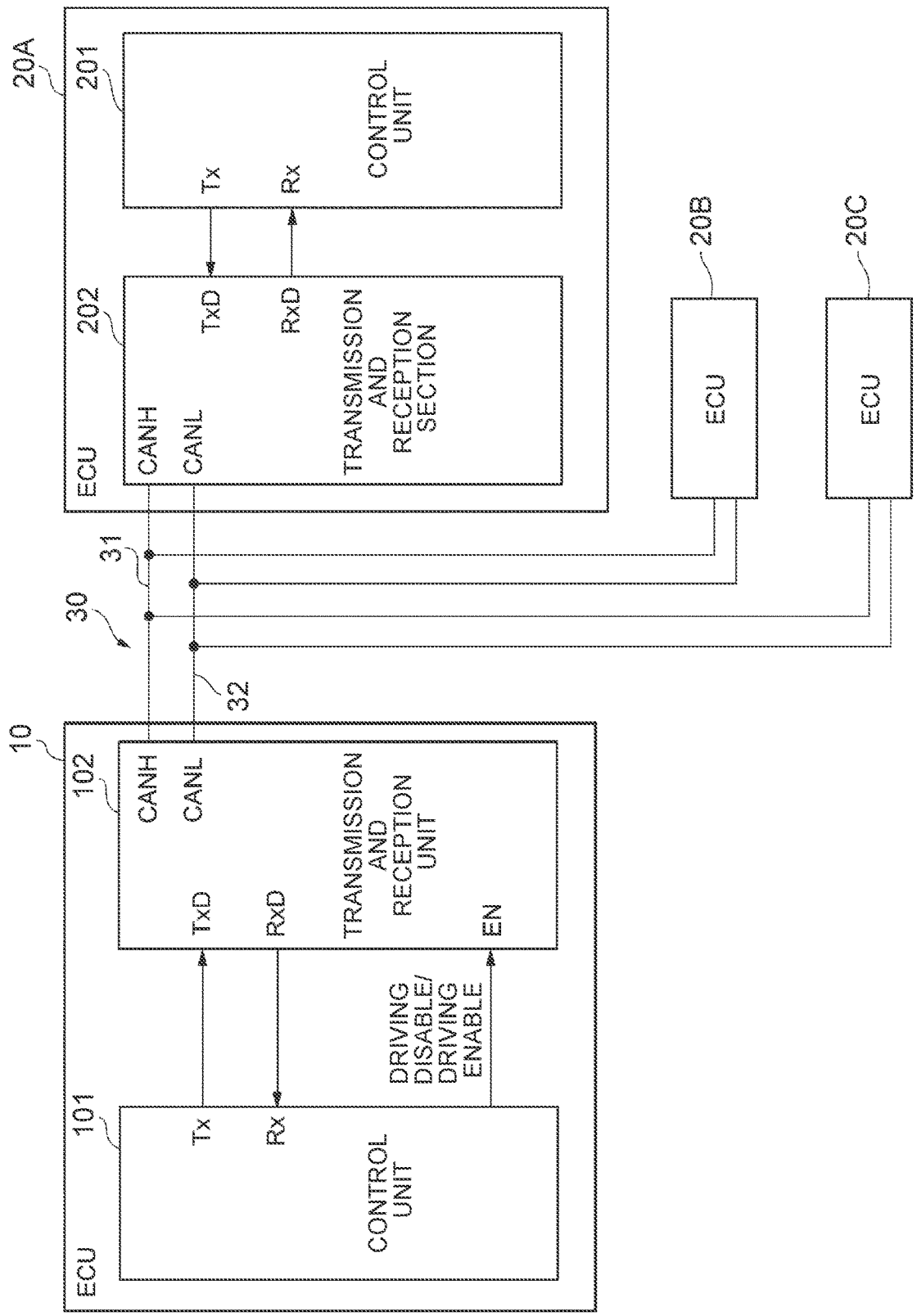
FIG. 2 is a diagram illustrating an example of a configuration of the communication control system 1 according to the present embodiment.

FIG. 2 is a diagram illustrating an example of a configuration of a communication control system according to the present embodiment. As illustrated in FIG. 2, the bus 30 including the communication line 31 and the communication line 32 is, for example, a Controller Area network (CAN) bus. The bus 30 is used to transmit signals of a differential transmission scheme. The communication lines 31 and 32 may be referred to as "CANH" and "CANL", "first communication line", and "second communication line", respectively.

In the differential transmission method, a signal is transmitted by switching between a first state having a potential difference between the communication lines 31 and 32 (hereinafter referred to as "Dominant") and a second state having no potential difference between the communication lines 31 and 32 (hereinafter referred to as "Recessive"). The dominance can be said to be the state in which the communication lines 31 and 32 are active. Also, recessive can be said to be a state in which the communication lines 31 and 32 are inactive or idle. For example, even if ECU 20A outputs recessive, if ECU 10 outputs dominant, the communication lines 31 and 32 are overwritten dominant.

ECU 10

As illustrated in FIG. 2, ECU 10 includes a control unit 101 and a transmission and reception unit 102. Note that FIG. 2 is merely an example, and it is needless to say that ECU 10 may include a configuration (for example, a storage unit that stores various types of data and programs) that is not illustrated.

The control unit 101 performs various types of control related to ECU 10. The control unit 101 may include, for example, a microcomputer and/or CAN controllers. The microcomputer is also referred to as a Micro controller Unit (MCU, a microcomputer, or the like. A unit (for example, a microcomputer and/or a CAN controller) functioning as the control unit 101 may include a plurality of terminals including a terminal Tx used for transmitting a signal and a terminal Rx used for receiving a signal.

Specifically, the control unit 101 controls transmission or reception of a signal by the transmission and reception unit 102. The control unit 101 may switch the terminal Tx in a Non Return to Zero (NRZ manner in response to the transmission-data, and may transmit the signal to the transmission and reception unit 102. For example, the control unit 101 may set the voltage level of the terminal Tx to a low level (hereinafter referred to as "Lo") corresponding to the bit value "0" of the transmitted data. The control unit 101 may set the voltage level of the terminal Tx to a level higher than Lo (hereinafter referred to as "Hi") corresponding to the bit value "1" of the transmitted data.

In addition, the control unit 101 detects occurrence of an abnormality in the own apparatus. For example, when the communication lines 31 and 32 are dominantly fixed by fixing the voltage level of the terminal Tx to Lo (hereinafter, referred to as "Lo fixing"), the control unit 101 may detect an anomaly in the own device. The fixing means that the same voltage level is continued for a predetermined period or a predetermined number of bits. For example, the control unit 101 may detect Lo fixation of the terminal Tx based on the mirror data from the transmission and reception unit 102. Here, the mirror data is a signal having the same waveform as the signal outputted from the control unit 101 to the transmission and reception unit 102 using the terminal Tx. The control unit 101 may detect Lo fixing of the terminal Tx by Lo fixing of the terminal Rx to which the mirror data is inputted from the transmission and reception unit 102.

The control unit 101 controls driving of the transmission and reception unit 102 based on a detection result of occurrence of an abnormality in its own apparatus. Specifically, the control unit 101 may prohibit the driving of the transmission and reception unit 102 in a case where the occurrence of an abnormality in the own device is detected. In this case, the control unit 101 may transmit a signal for prohibiting driving of the transmission and reception unit 102 (hereinafter, referred to as a "drive prohibition signal") to the transmission and reception unit 102. On the other hand, when the occurrence of an abnormality in the own device is not detected, the control unit 101 may permit the driving of the transmission and reception unit 102. In this case, the control unit 101 may transmit a signal permitting driving of the transmission and reception unit 102 (hereinafter, referred to as a "driving permission signal") to the transmission and reception unit 102.

The transmission and reception unit 102 transmits or receives a signal by switching the dominant or recessive state of the communication lines 31 and 32 under the control of the control unit 101. The transmission and reception unit 102 may be constituted by communication transceivers such as CAN transceivers, for example. The communication transceiver functioning as the transmission and reception unit 102 may include a plurality of terminals including a terminal TxD used for inputting a signal from the control unit 101, a terminal RxD used for outputting a signal to the control unit 101, a terminal EN for driving control of the transmission and reception unit 102, terminals CANH and CANL connected to the communication lines 31 and 32.

Specifically, the transmission and reception unit 102 may switch the dominant or recessive state of the communication lines 31 and 32 by switching the voltage levels of the terminals CANH and CANL in accordance with the voltage level of the terminal TxD. For example, when the voltage level of the terminal TxD is Lo, the transmission and reception unit 102 may set the voltage levels of the terminals CANH and CANL to voltage levels having a potential difference (for example, the terminal CANH is 3.5 V and the terminal CANL is 1.5 V). When the voltage level of the terminal TxD is Lo, the transmission and reception unit 102 may set the communication lines 31 and 32 to be dominant. On the other hand, when the voltage level of the terminal TxD is Hi, the transmission and reception unit 102 may set the voltage levels of the terminals CANH and CANL to the voltage level with no potential difference (for example, both the terminal CANH and the terminal CANL are 2.5 V). When the voltage level of the terminal TxD is Hi, the transmission and reception unit 102 may set the communication lines 31 and 32 to be recessive.

In addition, when the driving prohibition signal is inputted to the terminal EN, the transmission and reception unit 102 may set the voltage levels of the terminals CANH and CANL to voltage levels with no potential difference, regardless of the voltage level of the terminal TxD. When the driving prohibition signal is inputted to the terminal EN, the transmission and reception unit 102 may set the communication lines 31 and 32 to be recessive. On the other hand, when the drive enabling signal is inputted to the terminal EN, the transmission and reception unit 102 may control the voltage levels of the terminals CANH and CANL in accordance with the voltage level of the terminal TxD. The transmission and reception unit 102 may control the communication lines 31 and 32 to be dominant or recessive.

ECU 20

Next, the configuration of ECU 20 will be described. Although ECU 20A configurations are illustrated in FIG. 2, ECU 20 (e.g., ECU 20B and 20C) connected to the same communication lines 31 and 32 may have the same configuration. In addition, ECU 20 may include a configuration (for example, a storage unit that stores various types of data and programs) that is not illustrated.

As illustrated in FIG. 2, ECU 20A includes a control unit 201 and a transmission and reception unit 202. Hereinafter, the control unit 201 and the transmission and reception unit 202 will be described with a focus on differences from the control unit 101 and the transmission and reception unit 102. The description of the same points will not be repeated.

The control unit 201 detects occurrence of an abnormality in communication using the communication lines 31 and 32. Specifically, when the terminal Rx is Lo fixed by the dominant fixing of the communication lines 31 and 32, the control unit 201 detects that the communication is abnormal.

When the occurrence of an abnormality in communication using the communication lines 31 and 32 is detected, the control unit 201 may control the operation of the own apparatus so that the vehicle 2 travels in a fail-safe manner once. In a case where the occurrence of the abnormality in the communication is detected, the control unit 201 may control the operation of the own apparatus so that the vehicle 2 normally travels if the predetermined condition is satisfied. Specifically, if the predetermined condition is satisfied, the control unit 201 may control the operation of the own apparatus so that the vehicle 2 returns from fail-safe running to normal running. The operation of the own apparatus may be, for example, an operation for controlling a component (for example, an engine, a brake, a steering, or the like) of the vehicle 2. Further, the predetermined condition may be, for example, that the dominant fixation of the communication lines 31 and 32 is eliminated (that is, the communication lines 31 and 32 become normal). When the control unit 201 detects that the dominant fixation of the communication lines 31 and 32 is eliminated (that is, the communication lines 31 and 32 are normally restored), the control unit 201 may estimate that an ECU in which an anomaly is detected (hereinafter, referred to as "failure ECU") is ECU 10. When the failure ECU is ECU 10, the communication lines 31 and 32 are restored by prohibiting ECU 10 from being driven by the transmission and reception unit 102. Thus, communication between ECU 20 can be resumed. On the other hand, when the failure ECU is another ECU 20, the other ECU 20 does not restore the communication lines 31 and 32. Therefore, when the communication lines 31 and 32 are restored, the control unit 101 can estimate that the failure ECU is ECU 10.

On the other hand, when the control unit 201 detects the occurrence of the abnormality of the communication using the communication lines 31 and 32, if the predetermined condition is not satisfied, the control unit 201 may control the operation of its own device so that the vehicle 2 continues to fail-safe running. For example, the control unit 201 may estimate that the failure ECU is ECU 20 when the dominant fixation of the communication lines 31 and 32 is not resolved (that is, the communication lines 31 and 32 are not normally restored). In this case, the control unit 201 may control the operation of the own apparatus so as to maintain the fail-safe travel of the vehicle 2.

Figure 3:
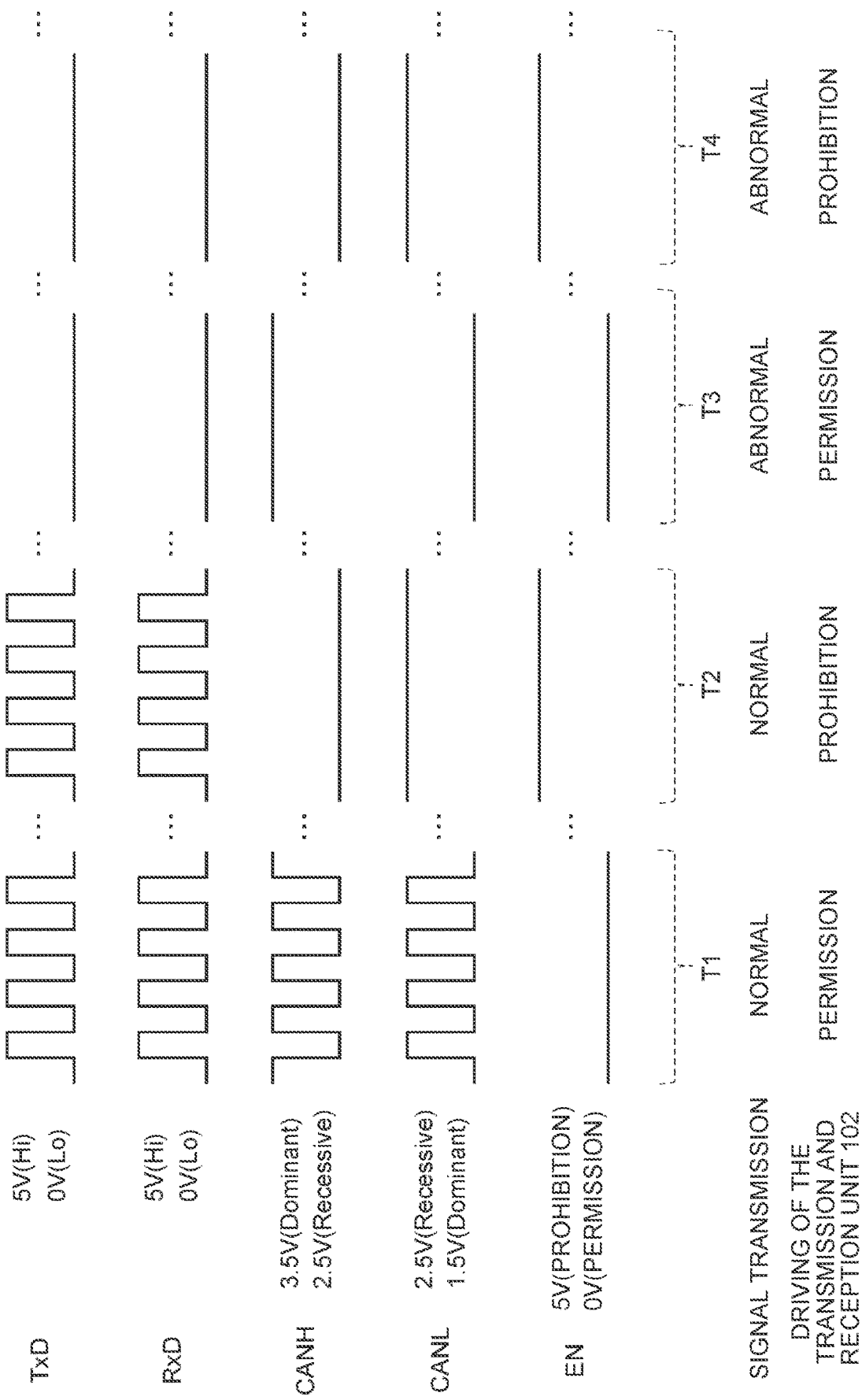
FIG. 3 is a diagram illustrating an exemplary operation of ECU 10 according to the present embodiment.

FIG. 3 is a diagram illustrating an exemplary status of terminals provided in ECU 10 according to the present embodiment. In FIG. 3, the states of the terminal TxD, terminal RxD, terminal CANH, terminal CANL, and terminal EN provided in the communication transceiver that functions as the transmission and reception unit 102 are shown in chronological order.

For example, in FIG. 3, Hi of the terminals TxD and RxD are 5 V. It is assumed that level of Lo is 0 V. Also, the voltage level with the potential difference of the terminal CANH is 3.5 V. It is assumed that the potential difference between the terminals CANL is 1.5 V. In addition, it is assumed that both the voltage level without the potential difference of the terminal CANH and the voltage level without the potential difference of the terminal CANL are 1.5 V. The voltage-level of the terminal EN used as the driving prohibition signal is 5 V. It is assumed that the voltage-level of the terminal EN used as the drive enable signal is 0 V. Note that FIG. 3 is merely an example, and the voltage level of each terminal is not limited thereto.

For example, in the period T1 of FIG. 3, an exemplary case in which signaling is normal and driving of the transmission and reception unit 102 is permitted is shown. According to the bit value of the transmission data, the voltage levels of the terminal Tx (not shown in FIG. 3) provided in the unit functioning as the control unit 101 and the terminal TxD provided in the communication transceivers functioning as the transmission and reception unit 102 are controlled. In FIG. 3, for example, an example of the transmission data "010101010" is shown. The voltage levels of the terminals Tx and TxD are Lo corresponding to the bit-value "0" of the transmitted data. On the other hand, the voltage levels of the terminals Tx and TxD are Hi corresponding to the bit-value "1" of the transmitted data. Further, since the mirror data of the signal inputted from the terminal TxD is outputted from the terminal RxD, the voltage level of the terminal RxD is the same as the voltage level of the terminal TxD. Further, in the period T1, since the driving of the transmission and reception unit 102 is permitted, the voltage level of the terminal EN becomes 0 V as the driving permission signal.

In the period T1, when the voltage level of the terminal TxD is Lo, the voltage level of the terminal CANH is 3.5 V. In this case, the voltage-level of the terminal CANL is 1.5 V. Since there is a potential difference between the terminals CANH and CANL, the communication lines 31 and 32 become dominant. On the other hand, when the voltage level of the terminal TxD is Hi, the voltage levels of both the terminals CANH and CANL are 2.5 V. Since there is no potential difference between the terminals CANH and CANL, the communication lines 31 and 32 are recessive.

In the period T2, an exemplary case where the signaling is normal and the driving of the transmission and reception unit 102 is prohibited is shown. In the period T2, since the driving of the transmission and reception unit 102 is prohibited, the voltage level of the terminal EN becomes 5 V as the driving prohibition signal. In the period T2, as in the period T1, when transmitting the transmitted data "010101010", the terminals TxD and RxD are controlled in the same manner as in the period T1. On the other hand, since the driving of the transmission and reception unit 102 is prohibited, the voltage levels of both the terminal CANH and CANL are 2.5 V regardless of the input of the signal to the terminal TxD (that is, regardless of the voltage level of the terminal TxD). Since there is no potential difference between the terminals CANH and CANL, the communication lines 31 and 32 are recessive, and ECU 10 does not affect the communication lines 31 and 32.

In the period T3, an anomaly in signal-transmission is detected, but the driving of the transmission and reception unit 102 is permitted. In the period T3, since the driving of the transmission and reception unit 102 is permitted, the voltage-level of the terminal EN becomes 0 V as the driving permission signal. In the period T3, since the voltage levels of the terminals Tx and TxD are fixed to Lo, the voltage level of the terminal CANH is fixed to 3.5 V. The voltage-level of the terminal CANL is fixed to 1.5 V. Since there is a potential difference between the terminals CANH and CANL, the communication lines 31 and 32 are dominantly fixed. Therefore, even if ECU 20 tries to transmit data, the voltage-level of the communication lines 31 and 32 cannot be changed. ECU 20 cannot transmit data. In addition, as in the period T1, since the voltage levels of the communication lines 31 and 32 cannot be changed in accordance with the transmission data "010101010", ECU 20 cannot normally receive the transmission data from ECU 10.

The period T4 shows an exemplary case where an anomaly in signal-transmission is detected and the driving of the transmission and reception unit 102 is prohibited. In the period T4, since the driving of the transmission and reception unit 102 is prohibited, the voltage level of the terminal EN becomes 5 V as the driving prohibition signal. In the period T3, the voltage levels of the terminals Tx and TxD are fixed to Lo, but since the driving of the transmission and reception unit 102 is prohibited, the voltage levels of both the terminals CANH and CANL are 2.5 V. Since there is no potential difference between the terminals CANH and CANL, the communication lines 31 and 32 are recessive, and ECU 10 does not affect the communication lines 31 and 32.

Although the state of the terminals provided in ECU 10 has been described in FIG. 3, the states of the terminals provided in ECU 20 may be changed in the same manner.

FIG. 4 is a diagram illustrating an exemplary correspondence when ECU 10 according to the present embodiment is abnormal. In FIG. 4, the control unit 101 of ECU 10 detects an anomaly in its own device due to Lo fixing of the terminal Tx. In this instance, the communication lines 31 and 32 are dominantly fixed, as indicated by the periods T3 and T4 in FIG. 3. For this reason, ECU 10 separates ECU 10 from the communication lines 31 and 32 by prohibiting driving of the transmission and reception unit 102 as illustrated in the period T4 of FIG. 3. Further, ECU 20 estimates that the failure ECU is ECU 10 if the predetermined condition is satisfied, and performs control so that the vehicles 2 travel normally. ECU 20 controls the vehicle 2 to run in a fail-safe manner if the predetermined condition is not satisfied.

Operation of the Communication Control System

Figure 5:
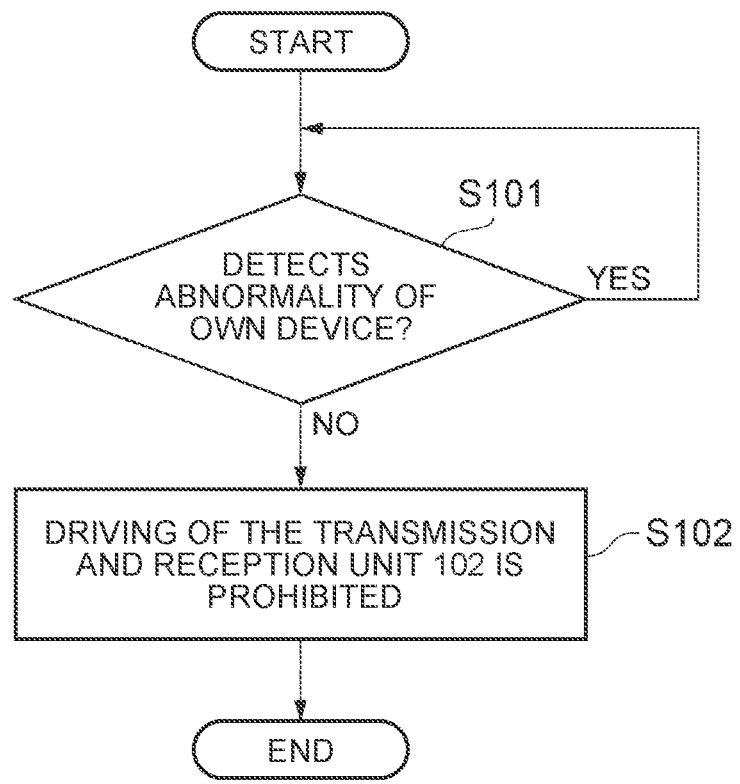
FIG. 5 is a flow chart illustrating an exemplary operation of ECU 10 according to the present embodiment.
Figure 6:
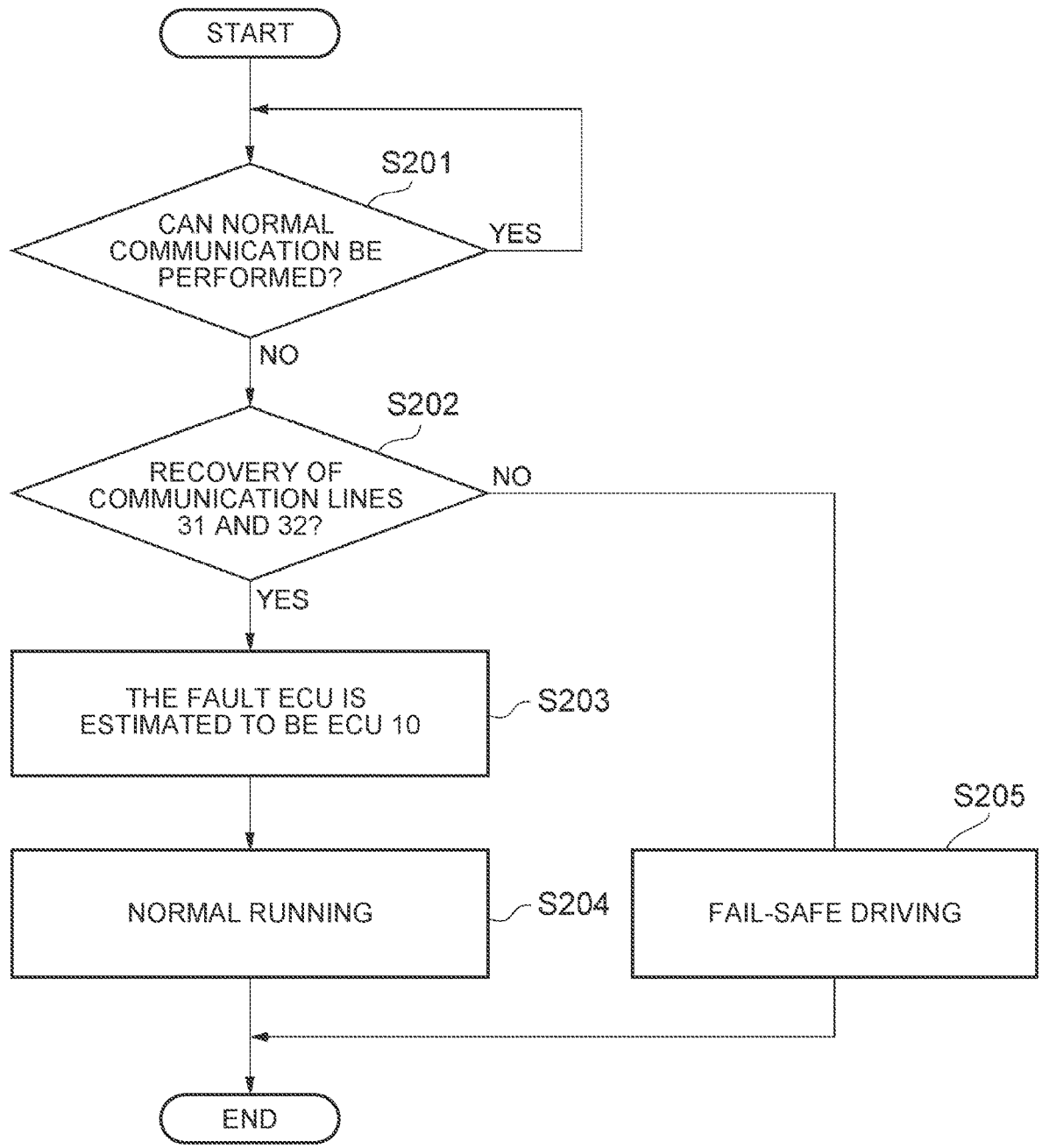
FIG. 6 is a flow chart illustrating an exemplary operation of ECU 20 according to the present embodiment.

FIG. 5 and FIG. 6 are flow charts illustrating exemplary operations of ECU 10 and the respective ECU 20 according to the present embodiment. Note that FIG. 5 and FIG. 6 are merely examples, and the order of at least two steps may be changed, or steps (not shown) may be added.

As illustrated in FIG. 5, ECU 10 determines whether or not an anomaly of the own device has been detected (step S101). For example, when the communication lines 31 and 32 are dominantly fixed due to Lo fixing of the terminal Tx, ECU 10 may detect an anomaly in the own device. When an anomaly of the own device is detected (step S101; YES), ECU 10 prohibits the transmission and reception unit 102 from being driven (step S102). ECU 10 repeats S101 of steps until it detects an anomaly in its own device. Since ECU 10 prohibits the driving of the transmission and reception unit 102, ECU 10 is separated from the communication lines 31 and 32, and thus the dominant fixation of the communication lines 31 and 32 is eliminated. The communication lines 31 and 32 are normally restored.

As illustrated in FIG. 6, ECU 20 determines whether communication using the communication lines 31 and 32 is normal (step S201). For example, ECU 20 determines whether or not dominant fixation of the communication lines 31 and 32 has occurred. ECU 20 may determine that normal communication is not possible when dominant fixation of the communication lines 31 and 32 occurs. While normal communication is enabled, ECU 20 repeats S201 of steps.

When the communication using the communication lines 31 and 32 is not normal (S201; NO in steps), ECU 20 may control the operation of the own device so that the vehicles 2 will fail once. Further, ECU 20 determines whether or not a predetermined condition is satisfied (step S202). In FIG. 5, as the predetermined condition, for example, it is determined whether or not the communication lines 31 and 32 are normally restored.

When the communication lines 31 and 32 are normally restored (step S202; YES), ECU 20 may determine that the driving of the transmission and reception unit 102 of ECU 10 is prohibited and estimate that the failure ECU is ECU 10 (step S203). When determining that the failure ECU is ECU 10, ECU 20 controls the operation of the own device so that the vehicles 2 travel normally (step S204). For example, ECU 20 may control the operation of the own device so that the vehicle 2 transitions from fail-safe running to normal running.

On the other hand, when the communication lines 31 and 32 are not restored (step S202; NO), ECU 20 may control the operation of the own device so that the vehicles 2 travel in a fail-safe manner (step S205). When the communication lines 31 and 32 are not restored, ECU 20 may estimate that the failure ECU is another ECU 20, and may determine that the fail-safe driving of the vehicle 2 is required.

As described above, according to the communication control system 1 of the present embodiment, in the communication control system 1, the normal operation or the fail-safe operation of a particular device (for example, the vehicle 2) on which the communication control system 1 is mounted is switched according to the type of the failure ECU. More specifically, ECU other than the failure ECU controls the operation of the own device such that the particular device performs normal operation or fail-safe operation based on whether the failure ECU is a type of ECU for which fail-safe operation is required. Therefore, in the communication control system 1 in which a plurality of ECU connected to the same bus 30 perform communication by the half-duplex communication method, when an error occurs in one ECU, an ECU other than the failure ECU can be appropriately operated.

In the above embodiment, ECU 10 is detected by, for example, Lo fixing of the terminal Tx, but the present disclosure is not limited thereto. For example, the abnormality of ECU 10 may be detected when the waveform of TxD terminal of the transceiver as the transmission and reception unit 102 becomes abnormal due to the abnormality of the microcomputer as the control unit 101.

The embodiments described above are intended to facilitate understanding of the present disclosure. It is not intended to be construed as limiting the disclosure. Each element included in the embodiment and its arrangement, material, condition, shape, size, and the like are not limited to those exemplified, and can be appropriately changed. Further, the configurations shown in the different embodiments can be partially replaced or combined.

What is claimed is:

1. A control device of a first classification in a communication control system including the control device of the first classification and one or more control devices of a second classification connected to the same bus as the control device of the first classification, the control device comprising:
   a transmission and reception unit that transmits or receives a signal via the bus by a half-duplex communication method; and
   a control unit that prohibits driving of the transmission and reception unit when an occurrence of an abnormality in an own device is detected,
   wherein, in the half-duplex communication method, the control device of the first classification and the one or more control devices of the second classification cannot transmit signals simultaneously via the bus, and
   wherein, by prohibiting driving of the transmission and reception unit, the control device of the first classification is separated from the bus and the bus is restored for the one or more control devices of the second classification to transmit or receive the signal.

2. The control device according to claim 1, wherein
the bus is composed of a first communication line and a second communication line, and
the transmission and reception unit transmits or receives the signal by switching between a first state having a potential difference between the first communication line and the second communication line and a second state having no potential difference.

3. The control device according to claim 2, wherein the control unit detects the abnormality in the own device when the first communication line and the second communication line are fixed to the first state due to a terminal used for transmitting the signal being fixed to a particular state.

4. The communication control system that includes the control device according to claim 1 and that is mounted on a particular device, wherein the control device of the second classification includes:
a transmission and reception unit that receives or transmits the signal via the bus by a half-duplex communication method; and
a control unit that controls an operation of an own device such that the particular device operates normally, based on a predetermined condition when the occurrence of the abnormality in the control device of the first classification is detected.

5. The communication control system according to claim 4, wherein the control unit of the control device of the second classification controls the operation of the own device such that the particular device performs a fail-safe operation when an occurrence of an abnormality in another control device of the second classification is detected.

6. The communication control system according to claim 5, wherein the control unit of the control device of the first classification controls the operation of the own device based on information on a power supply of the particular device, the information being information supplied from the control device of the second classification.

7. The communication control system according to claim 6, wherein the particular device is a vehicle.

8. The control device according to claim 1,
wherein the control device of the first classification is a control device in which fail-safe operation of the vehicle is not required, and
the one or more control devices of the second classification are control devices in which fail-safe operation of the vehicle is required.

9. The control device according to claim 1,
wherein when the bus is not restored after the transmission by the transmission and reception unit is prohibited, the control unit is configured to estimate that the abnormality occurred in the one or more control devices of the second classification.

10. A communication control method for a communication control system including a control device of a first classification and one or more control devices of a second classification connected to the same bus as the control device of the first classification, the communication control method comprising:
transmitting or receiving a signal via the bus by a half-duplex communication method by the control device of the first classification; and
prohibiting driving of a transmission and reception unit included in the control device of the first classification by the control device of the first classification when an occurrence of an abnormality in an own device is detected,
wherein, in the half-duplex communication method, the control device of the first classification and the one or more control devices of the second classification cannot transmit signals simultaneously via the bus, and
wherein, by prohibiting driving of the transmission and reception unit, the control device of the first classification is separated from the bus and the bus is restored for the one or more control devices of the second classification to transmit or receive the signal.

11. A non-transitory storage medium storing a communication control program that causes a processor provided in a control device of a first classification in a communication control system including the control device of the first classification and one or more control devices of a second classification connected to the same bus as the control device of the first classification to function as:
a transmission and reception unit that transmits or receives a signal via the bus by a half-duplex communication method; and
a control unit that prohibits driving of the transmission and reception unit when an occurrence of an abnormality in an own device is detected,
wherein, in the half-duplex communication method, the control device of the first classification and the one or more control devices of the second classification cannot transmit signals simultaneously via the bus, and
wherein, by prohibiting driving of the transmission and reception unit, the control device of the first classification is separated from the bus and the bus is restored for the one or more control devices of the second classification to transmit or receive the signal.

* * * * *